(12) United States Patent
Zhang et al.

(10) Patent No.: US 10,846,751 B2
(45) Date of Patent: Nov. 24, 2020

(54) GENERATING DATA TO PREDICT USER AFFINITY FOR A COMPONENT TO BE INCLUDED IN A CONTENT ITEM OPTIMIZED FOR AN ONLINE SYSTEM USER

(71) Applicant: Facebook, Inc., Menlo Park, CA (US)

(72) Inventors: Zhurun Zhang, Bellevue, WA (US); Hao Zhang, Fremont, CA (US); Junbiao Tang, Mercer Island, WA (US); James Theodore Kleban, Seattle, WA (US); Avi Samuel Gavlovski, Kirkland, WA (US); Hao Song, Mountain View, CA (US); David Benjamin Lue, Palo Alto, CA (US); Anand Sumatilal Bhalgat, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 828 days.

(21) Appl. No.: 15/340,852

(22) Filed: Nov. 1, 2016

(65) Prior Publication Data

US 2018/0121964 A1   May 3, 2018

(51) Int. Cl.
  *G06Q 30/02* (2012.01)
  *G06Q 50/00* (2012.01)
  *G06N 20/00* (2019.01)

(52) U.S. Cl.
  CPC ......... *G06Q 30/0269* (2013.01); *G06N 20/00* (2019.01); *G06Q 30/0277* (2013.01); *G06Q 50/01* (2013.01)

(58) Field of Classification Search
  CPC .................................................. G06Q 30/0269
  USPC ....................................................... 705/14.43
  See application file for complete search history.

(56) References Cited

U.S. PATENT DOCUMENTS

| 8,458,194 B1 * | 6/2013 | Procopio ................. G06F 16/35 707/749 |
| 10,223,742 B2 * | 3/2019 | Arora ................ G06F 16/24578 |
| 2008/0040175 A1 * | 2/2008 | Dellovo ............ G06Q 10/0637 705/7.36 |
| 2015/0006280 A1 * | 1/2015 | Ruiz ..................... G06Q 30/00 705/14.45 |

* cited by examiner

*Primary Examiner* — Azam A Ansari
(74) *Attorney, Agent, or Firm* — Fenwick & West LLP

(57) ABSTRACT

An online system receives multiple candidate components for including in content items to be presented to online system users. Upon identifying an opportunity to present content to a subject user of the online system, the online system dynamically generates an optimal content item for presentation to the subject user that includes one or more candidate components. Candidate components included in the optimal content item are selected by predicting an affinity of the subject user for each candidate component. The affinity of the subject user for a candidate component may be predicted using a machine-learned model that is trained using historical performance information about content items including the candidate component that were presented to viewing users of the online system having at least a threshold measure of similarity to the subject user. Components of content items used to train the model may be selected using a heuristic (e.g., Thompson sampling).

23 Claims, 4 Drawing Sheets

GENERATING DATA TO PREDICT USER AFFINITY FOR A COMPONENT TO BE INCLUDED IN A CONTENT ITEM OPTIMIZED FOR AN ONLINE SYSTEM USER

BACKGROUND

This disclosure relates generally to online systems, and more specifically to generating data to predict user affinity for a component to be included in a content item optimized for an online system user.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained by online systems, an online system provides an ideal forum for allowing users to share content by creating content items for presentation to additional online system users. For example, users may share photos or videos they have uploaded by creating content items that include the photos or videos that are presented to additional users to whom they are connected in the online system. An online system also provides advertisers with abundant opportunities to increase awareness about their products or services by presenting advertisements to online system users. For example, advertisements presented to users allow an advertiser to gain public attention for products or services and to persuade online system users to take an action regarding the advertiser's products, services, opinions, or causes.

Conventionally, online systems generate revenue by displaying content to their users. For example, an online system may charge advertisers for each presentation of an advertisement to an online system user (i.e., each "impression"), or for each interaction with an advertisement by an online system user (e.g., each click on the advertisement, each purchase made as a result of clicking through the advertisement, etc.). Furthermore, by presenting content that encourages user engagement with online systems, online systems may increase the number of opportunities they have to generate revenue. For example, if an online system user scrolls through a newsfeed to view content that captures the user's interest, advertisements that are interspersed in the newsfeed also may be presented to the user.

To maximize revenue, online systems may select content items for presentation to online system users based on targeting criteria associated with the content items that specify one or more attributes of online system users eligible to be presented with the content items. For example, targeting criteria are used to identify users associated with specific user profile information satisfying at least one of the targeting criteria. Attributes specified by targeting criteria are usually associated with online system users who are likely to have an interest in content items associated with the targeting criteria or who are likely to find such content items relevant. For example, content items associated with the board game chess may be associated with targeting criteria describing online system users who have expressed an interest in board games (e.g., users who have included playing board games as a hobby in their profile information, users who have downloaded game applications for board games in the online system, etc). Hence, targeting criteria allow online systems to present content items to users who are likely to have affinities for such content items.

Targeting criteria are conventionally specified by online system users who have provided the content items with which they are associated. For example, an advertiser may specify targeting criteria associated with an advertisement for a van that describe users who are parents or who are expecting to become parents in the near future (e.g., users who have joined a group maintained by an online system for parents, users who have clicked on advertisements for toys or children's clothing, etc.). However, in some instances, it may be difficult or impractical for targeting criteria to be specified for a content item. For example, advertisements and other types of content items may be composed of several interchangeable content item components that may be combined in different ways to create hundreds or even thousands of unique content items that each are associated with different targeting criteria. In such situations, it may be cumbersome for an advertiser or other user providing the content item components to specify targeting criteria for each unique content item that may be created. Furthermore, online systems may find it unmanageable to store information describing every possible unique content item, as well as targeting criteria associated with each unique content item.

SUMMARY

An online system receives multiple candidate content item components ("candidate components") of at least one type (e.g., title, image, body text, call to action, video, etc.) from a content-providing user of the online system (e.g., an advertiser) for including in a content item to be presented to viewing users of the online system. Each candidate component may be associated with information that identifies a type associated with the candidate component (e.g. title, image, etc.) and/or an identifier that uniquely identifies the candidate component. The online system also may receive one or more rules from the content-providing user. A rule may describe how the candidate components may or may not be combined in a content item, how the candidate components may be arranged within the content item, etc. For example, a rule may require that a content item include exactly one candidate title component, at least one candidate call to action component, and no more than two candidate video components. In this example, an additional rule may require that the candidate title component appear at the top of the content item and that the text included in the candidate title component appear in a font size that is larger than the font size of text included in any other candidate component included in the content item.

Upon identifying an opportunity to present a content item to a subject user of the online system (i.e., an "impression" opportunity), the online system dynamically generates an optimal content item (e.g., an optimal advertisement) for presentation to the subject user using one or more of the candidate components. For example, if the online system receives multiple candidate title components and multiple candidate image components that may be included in an advertisement, upon identifying an opportunity to present an advertisement to the subject user, the online system selects a combination of the components that is optimized for the subject user and generates an advertisement including the selected components for presentation to the subject user. A content item is optimal if it includes a particular candidate component or a particular combination of candidate components selected specifically for a subject user, such that the likelihood that the subject user will perform an interaction with the content item (e.g., click on the content item) when presented with the content item is maximized.

The optimal content item is included in a content selection process (e.g., an auction) that selects one or more content items for presentation to the subject user. For example, the online system includes an optimal advertisement in an advertisement auction that ranks the optimal advertisement among one or more additional advertisements based on a bid amount associated with each advertisement and selects a highest ranked advertisement for presentation to the subject user. The online system may then present the selected content item to the subject user (e.g., in a display area of a client device associated with the subject user).

The online system selects components to include in the optimal content item to be presented to the subject user based on an affinity score of the subject user predicted for each candidate component, in which an affinity score for a candidate component indicates the subject user's predicted affinity for the candidate component. For example, the online system predicts affinity scores of the subject user for candidate components and selects the candidate components that are associated with the highest affinity scores for inclusion in the optimal content item (e.g., by ranking multiple candidate components of various types based on their affinity scores and selecting the highest ranked candidate component of each type).

In some embodiments, the online system selects candidate components to include in the optimal content item based on a marginal effect each candidate component has on the probability that the subject user will perform an interaction with the optimal content item. For example, if each of several candidate components is associated with an affinity score that indicates the subject user's predicted click-through rate for a content item including the candidate component, the difference between a pair of affinity scores indicates a marginal effect on the predicted click-through rate for the content item based on whether the content item includes one candidate component of the pair or the other candidate component of the pair. In this example, the online system may identify multiple pairs of candidate components and select the candidate component responsible for the greatest marginal improvement in the subject user's predicted click-through rate to include in the optimal content item.

The online system may use an independent selection process to select each type of candidate component to include in the optimal content item. For example, to select a title component and an image component to include in an optimal content item, the online system ranks all candidate title components based on their associated affinity scores and selects the highest ranked candidate title component for inclusion in the optimal content item. In this example, the online system also ranks all candidate image components in a separate ranking and selects the highest ranked candidate image component for inclusion in the optimal content item.

In various embodiments, the online system selects components to include in the optimal content item based on a total affinity score of the subject user predicted for each of multiple candidate content items based on the predicted affinity scores of the subject user for each candidate component included in each candidate content item. For example, the total affinity score of the subject user for a candidate content item that includes several candidate components is predicted based on a sum of the affinity scores of the subject user predicted for its candidate components, in which the affinity score for each type of candidate component is weighted differently. As an additional example, in embodiments in which the online system receives one or more rules from the content-providing user, the online system generates multiple candidate content items subject to the rules and predicts a total affinity score of the subject user for each candidate content item based on a sum of the affinity scores of the subject user predicted for its candidate components. The content item generator 240 may rank the candidate content items in the above example based on their associated total affinity scores and select the candidate components included in the highest ranked candidate content item for inclusion in the optimal content item.

In some embodiments, the affinity score of the subject user for a candidate component may be predicted using a machine-learned model. The online system may train the machine-learned model to predict an affinity score of the subject user for a candidate component using affinity scores of viewing users of the online system for the candidate component, in which the viewing users have at least a threshold measure of similarity to the subject user (e.g., based on attributes shared by the subject user and the viewing users). For example, the online system trains the machine-learned model using a set of affinity scores of viewing users of the online system for each candidate component included in "training content items" presented to the viewing users and information describing the ages and genders of the viewing users. In this example, the online system may then use the machine-learned model to predict an affinity score of the subject user for a candidate component based on affinity scores of the viewing users for the candidate component, in which the viewing users share attributes with the subject user.

The machine-learned model may predict an affinity score of the subject user for a candidate component based on additional types of information as well. In some embodiments, the machine-learned model may predict the affinity score based on features specific to the candidate component. For example, the machine-learned model is trained to predict an affinity score of the subject user for a candidate title component based on features specific to candidate title components (e.g., font type, font color, font size, title length, character spacing, etc.) using historical performance information associated with training content items including candidate components that are associated with these features. The machine-learned model may account for one or more rules received from the content-providing user when predicting an affinity score of the subject user for a candidate component. For example, if a rule received from an advertiser restricts presentation of particular candidate image components to subject users who are at least 18 years old, the machine-learned model does not predict an affinity score of the subject user for these candidate image components if the subject user is not at least 18 years old.

The affinity score of a viewing user for a candidate component may be computed based on historical performance information associated with training content items including the candidate component. For example, if one or more training content items including a candidate component are presented to a viewing user of the online system, an affinity score of the viewing user is computed for the candidate component based on a set of interactions by the viewing user with the training content items (e.g., none, click, share, etc.), such that the affinity score is proportional to the number or frequency of interactions.

In some embodiments, the historical performance information used to train the machine-learned model is associated with training content items generated from randomly selected candidate components, in which the training content items have achieved at least a threshold number of impressions (e.g., 1,000 impressions). For example, if the content-providing user provides 13 different candidate image components to the online system, the online system randomly selects one of the candidate image components to include in a training content item that is presented to a viewing user of the online system and repeats this process until at least a threshold number of impressions have been achieved for each candidate image component. In this example, performance information associated with each impression of the training content items is used to train the machine-learned model. The training content items may be generated subject to one or more rules received from the content-providing user. For example, a rule may require that at most two of the 13 candidate image components in the previous example may be included in the same training content item.

In addition to random selection, the historical performance information also may be associated with training content items generated from candidate components that are selected using a heuristic (e.g., Thompson sampling). For example, once the training content items that include randomly selected candidate components have achieved at least 1,000 impressions, the online system generates training content items that include candidate components that are selected using Thompson sampling. The online system may use Thompson sampling to select each candidate component to include in a training content item based on a distribution of affinity scores for each candidate component, in which the distribution of affinity scores for a candidate component is inversely proportional to the amount of data for the component (i.e., the number of impressions achieved by training content items including the component). In this example, as the number of impressions achieved by training content items including the candidate component increases, the distribution of affinity scores for the candidate component decreases. Thompson sampling may be performed on a Beta function based on a number of hits (e.g., clicks) and a number of misses (e.g., impressions that do not achieve clicks) associated with candidate components included in training content items presented to viewing users of the online system. In some embodiments, the online system uses the heuristic without having previously generated training content items from randomly selected candidate components. For example, Thompson sampling is performed on a Beta function that assumes a particular click-through rate associated with each candidate component to select candidate components to include in various training content items.

The heuristic may be used to select candidate components to include in training content items for each type of candidate component for various groups of viewing users of the online system until a stopping point is reached. For example, Thompson sampling may be used to select candidate components of each type to include in training content items presented to viewing users who are associated with different geographic locations. In this example, the training content items are presented to the viewing users and the process is repeated until the distribution of affinity scores for each component for each group of viewing users is less than a threshold distribution. The performance information may be stored in association with information describing attributes associated with the viewing users to whom the training content items were presented for subsequent retrieval (e.g., to train the machine-learned model).

The performance of a training content item including a candidate component may be tracked by the online system using a tracking mechanism (e.g., a tracking pixel, a digital watermark, or an image hash associated with each candidate component) that identifies each candidate component included in the training content item. The online system may store information describing the performance of a training content item in association with information identifying candidate components included in the training content item and information describing attributes associated with each viewing user to whom the training content item was presented. For example, the online system keeps track of and stores a number of viewing users of different ages and/or genders to whom training content items including various candidate components were presented and a percentage of these viewing users who performed an action specified by a call to action associated with the training content items (e.g., purchasing a product after clicking through a training content item). The stored information subsequently may be retrieved by the online system and used to compute affinity scores of the viewing users for each candidate component, which also may be stored.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
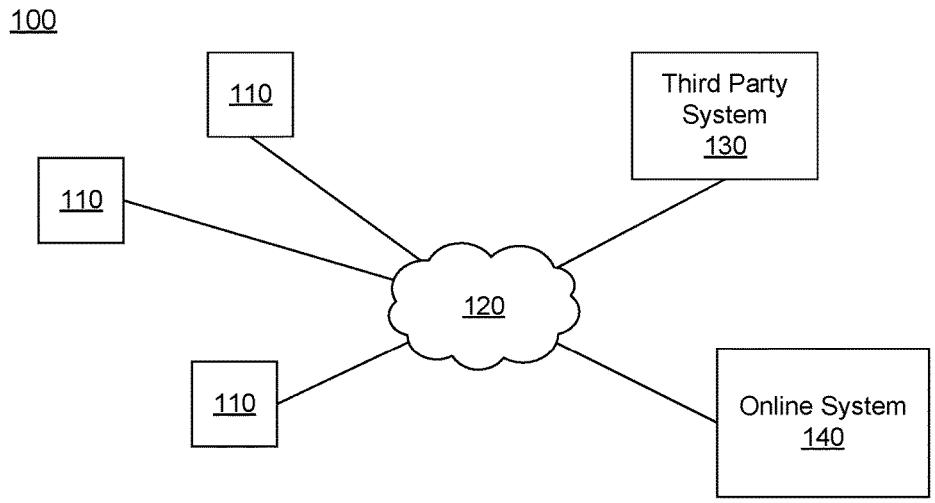
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third party systems 130, and the online system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 also may communicate information to the online system 140, such as advertisements, content, or information about an application provided by the third party system 130.

Figure 2:
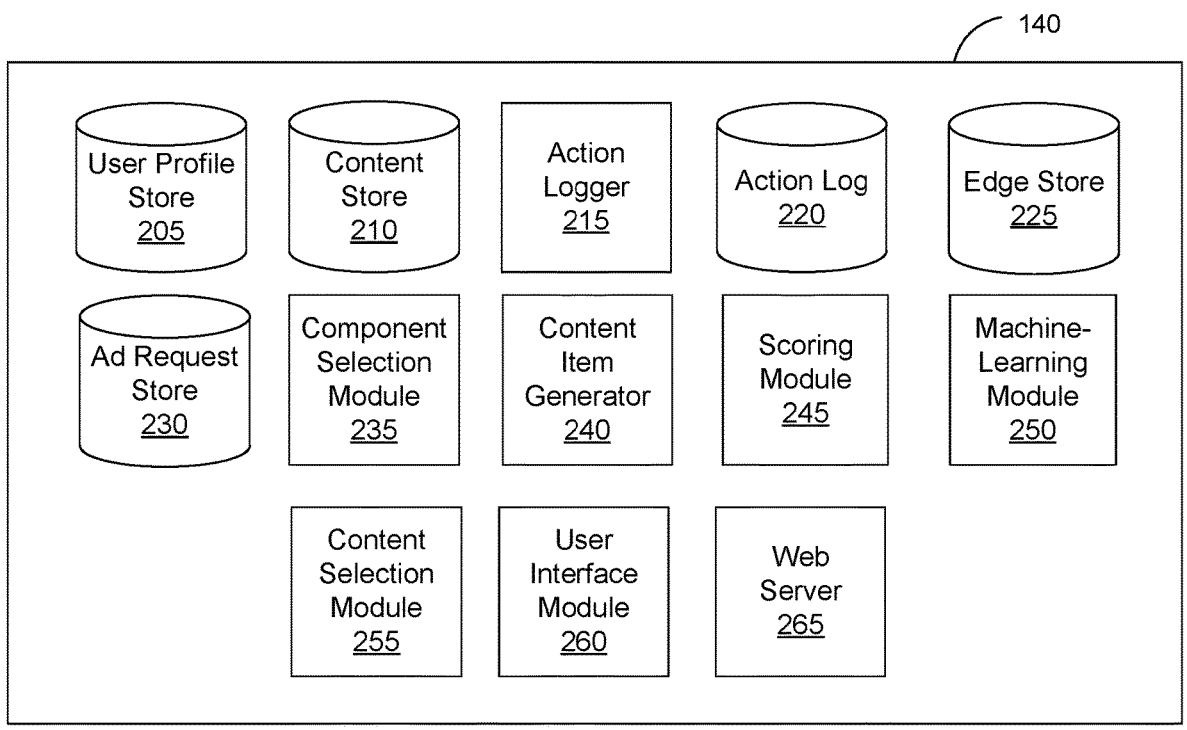
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an ad request store 230, a component selection module 235, a content item generator 240, a scoring module 245, a machine-learning module 250, a content selection module 255, a user interface module 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more user attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

In some embodiments, the user profile store 205 stores affinity scores of users of the online system 140 for candidate components. The affinity scores of users of the online system 140 (e.g., viewing users and subject users) indicate the users' affinities for various candidate components and may be stored in association with user profiles associated with the users. For example, the affinity score of a viewing user for a candidate component is stored in association with information identifying the viewing user and information identifying the candidate component in the user profile store 205.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In some embodiments, when the online system 140 receives candidate components from a content-providing user of the online system 140 (e.g., an advertiser) for including in a content item to be presented to viewing users of the online system 140, objects representing the candidate components are stored in the content store 210. Candidate components may be of various types, such as titles, images, bodies of text, calls to action, videos, or any other suitable types of components that may be included in a content item. Various types of information associated with each candidate component may be stored in association with an object representing a candidate component. For example, each object representing a candidate component may be stored in association with information that identifies a type associated with the candidate component (e.g. title, image, etc.) and/or an identifier that uniquely identifies the candidate component. As an additional example, each object representing a candidate component also may be stored in association with information associated with a content-providing user who provided the candidate component (e.g., a user identifier associated with an advertiser who provided the candidate component, one or more rules received from the content-providing user, etc.). In yet another example, each object representing a candidate component may be stored in association with information associated with presentation of a content item including the candidate component, such as a user identifier or attributes (e.g., demographic information) associated with a user to whom the content item was presented and information describing a type of interaction by the user with the content item (e.g., none, click, conversion, etc.).

The content store 210 also may store objects representing content items (e.g., training content items and optimal content items). For example, the content store 210 may store an object representing each training content item presented to a viewing user of the online system 140 and each optimal content item presented to a subject user of the online system 140. In some embodiments, each object representing a content item may include additional objects representing each candidate component included in the content item, which also may be stored in the content store 210. For example, an object representing a content item is a container object that contains other objects representing the candidate components of the content item, all of which are stored in the content store 210. Similar to the candidate components, as described above, the content store 210 also may include additional types of information that is stored in association with each object representing a content item (e.g., an identifier that uniquely identifies the content item, information associated with a content-providing user who provided one or more candidate components included in the content item, information associated with presentation of the content item, etc.).

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in the third party system 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinities, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 140 if an advertisement in the ad request is presented to a user, if a user interacts with the advertisement in the ad request when presented to the user, or if any suitable condition is satisfied when the advertisement in the ad request is presented to a user. For example, the bid amount specifies a monetary amount that the online system 140 receives from the advertiser if an advertisement in an ad request is displayed. In some embodiments, the expected value to the online system 140 for presenting the advertisement may be determined by multiplying the bid amount by a probability of the advertisement being accessed by a user.

In some embodiments, when the online system 140 receives candidate components from an advertiser for including in an advertisement to be presented to viewing users of the online system 140, objects representing the candidate components may be stored in the ad request store 230. As described above in conjunction with the content store 210, candidate components may be of various types (e.g., titles, images, bodies of text, etc.) and various types of information associated with each candidate component (e.g., information that identifies a type associated with the candidate component, an identifier that uniquely identifies the candidate component, etc.) may be stored in association with an object representing a candidate component in the ad request store 230.

The ad request store 230 also may store objects representing advertisements (e.g., training advertisements and optimal advertisements). For example, the ad request store 230 may store an object representing each training advertisement presented to a viewing user of the online system 140 and each optimal advertisement presented to a subject user of the online system 140. In some embodiments, each object representing an advertisement may include additional objects representing each candidate component included in the advertisement, which also may be stored in the ad request store 230. For example, an object representing an advertisement is a container object that contains other objects representing the candidate components of the advertisement, all of which are stored in the ad request store 230. The ad request store 230 also may include additional types of information that is stored in association with each object representing an advertisement (e.g., an identifier that uniquely identifies the advertisement, information associated with an advertiser who provided one or more candidate components included in the advertisement, information associated with presentation of the advertisement, etc.).

Additionally, an ad request may include one or more targeting criteria specified by the advertiser. Targeting criteria included in an ad request specify one or more user attributes of users eligible to be presented with advertisement content in the ad request. For example, targeting criteria are used to identify users associated with user profile information, edges, or actions satisfying at least one of the targeting criteria. Hence, targeting criteria allow an advertiser to identify users having specific user attributes, simplifying subsequent distribution of content to different users.

In one embodiment, targeting criteria may specify actions or types of connections between a user and another user or object of the online system 140. Targeting criteria also may specify interactions between a user and objects performed external to the online system 140, such as on a third party system 130. For example, targeting criteria identifies users who have performed a particular action, such as having sent a message to another user, having used an application, having joined or left a group, having joined an event, having generated an event description, having purchased or reviewed a product or service using an online marketplace, having requested information from a third party system 130, having installed an application, or having performed any other suitable action. Including actions in targeting criteria allows advertisers to further refine users eligible to be presented with advertisement content from an ad request. As another example, targeting criteria identifies users having a connection to another user or object or having a particular type of connection to another user or object. For example, targeting criteria in an ad request identifies users connected to an entity, where information stored in the connection indicates that the users are employees of the entity.

The component selection module 235 may retrieve (e.g., as shown in step 311 of FIG. 3) candidate components for including in a content item to be presented to users of the online system 140. For example, the component selection module 235 may retrieve objects representing candidate components from the content store 210 or from the ad request store 230. Candidate components of various types may be retrieved by the component selection module 235. Examples of candidate components that may be retrieved by the component selection module 235 include titles, images, bodies of text, calls to action, videos, audio clips, and other types of data that may be included in a content item or advertisement to be presented to one or more users of the online system 140.

The component selection module 235 selects (e.g., as shown in step 312 of FIG. 3) candidate components to include in one or more training content items to be presented to one or more viewing users of the online system 140. The component selection module 235 may select candidate components to be included in the training content items subject to one or more rules received from a content-providing user of the online system 140. For example, if a rule requires that a content item include exactly one title, one image, and one body of text, the component selection module 235 may select one of each of the types of required components to be included in a training content item. In some embodiments, the component selection module 235 selects candidate components to be included in training content items by randomly selecting the candidate components. In the above example, the component selection module 235 may randomly select one of each of the types of required components, such that each candidate component of each of the types of required components has an equal chance of being selected by the component selection module 235.

The component selection module 235 may select candidate components to include in a training content item using a heuristic. For example, the component selection module 235 uses Thompson sampling to select each candidate component to be included in a training content item based on a distribution of affinity scores for each candidate component, in which the distribution of affinity scores for a candidate component is inversely proportional to the amount of data for the candidate component. In this example, the distribution of affinity scores for each candidate component is inversely proportional to the number of impressions achieved by training content items including the candidate component, such that the distribution of affinity scores decreases as the number of impressions increases. The heuristic may be performed on a Beta function based on a number of hits (e.g., clicks) and a number of misses (e.g., impressions that do not achieve clicks) associated with candidate components included in training content items presented to viewing users of the online system 140.

The heuristic may be used to select candidate components to include in training content items until a stopping point is reached. For example, the component selection module 235 performs the heuristic to select candidate components that are of a specific type (e.g., titles) for each age group that may be associated with viewing users. The selected candidate components are included in training content items presented to viewing users until the distribution of affinity scores for each candidate component for each age group is less than a threshold distribution. In this example, the component selection module 235 repeats this process to select candidate components of other types (e.g., images, videos, etc.) for each age group until the distribution of affinity scores for each candidate component for each age group is less than the threshold distribution.

The component selection module 235 may use the heuristic to select candidate components to include in training content items once the training content items generated from randomly selected candidate components have achieved at least a threshold number of impressions. For example, the component selection module 235 randomly selects candidate components to include in training content items; once the training content items that include randomly selected candidate components have achieved at least 1,000 impressions, the component selection module 235 selects candidate components to be included in training content items using Thompson sampling. Alternatively, in some embodiments, the component selection module 235 uses the heuristic to select candidate components to include in training content items without having previously generated training content items from randomly selected candidate components. For example, the component selection module 235 selects candidate components to include in training content items by performing Thompson sampling on a Beta function that initially assumes a particular click-through rate and/or impression probability associated with each candidate component.

When the online system 140 identifies an opportunity to present a content item to a subject user of the online system 140, the component selection module 235 selects (e.g., as shown in step 345 of FIG. 3) one or more candidate components to include in an optimal content item to be presented to the subject user. For example, the component selection module 235 selects a particular candidate component or a particular combination of candidate components for inclusion in an optimal content item to be presented to the subject user, such that the likelihood that the subject user will perform an interaction with the optimal content item when presented with the optimal content item is maximized. The component selection module 235 may select components to include in the optimal content item to be presented to the subject user based on an affinity score of the subject user predicted for each candidate component. For example, the component selection module 235 selects the candidate components that are associated with the highest affinity scores predicted for the subject user for inclusion in the optimal content item (e.g., by ranking multiple candidate components of various types based on their affinity scores and selecting the highest ranked candidate component of each type).

Similar to the training content items, the component selection module 235 may select candidate components to include in the optimal content item subject to one or more rules received from a content-providing user of the online system 140. For example, if a rule received from an advertiser requires that an advertisement include exactly one title component and one image component, the component selection module 235 may select components to include in an optimal advertisement that complies with this rule. In this example, the component selection module 235 selects a candidate title component and a candidate image component associated with the highest affinity scores predicted for the subject user to include in the optimal advertisement.

In some embodiments, the component selection module 235 selects components to include in the optimal content item based on a marginal of effect each candidate component on a probability that the subject user will perform an interaction with the optimal content item. For example, if each of several candidate components is associated with an affinity score that indicates the subject user's predicted likelihood of making a purchase associated with a content item including the candidate component, the difference between a pair of affinity scores indicates a marginal effect on the predicted likelihood of making a purchase associated with the content item based on whether the content item includes one candidate component of the pair or the other candidate component of the pair. In this example, the component selection module 235 may identify multiple pairs of candidate components and select the candidate component responsible for the greatest marginal improvement in the subject user's predicted likelihood of making a purchase to include in the optimal content item.

The component selection module 235 may use an independent selection process to select each type of candidate component to include in the optimal content item. For example, to select a title component and an video component to include in an optimal content item, the component selection module 235 ranks all candidate title components based on their associated affinity scores and selects the highest ranked candidate title component for inclusion in the optimal content item. In this example, the component selection module 235 also ranks all candidate video components in a separate ranking and selects the highest ranked candidate video component for inclusion in the optimal content item.

In various embodiments, the component selection module 235 selects components to include in the optimal content item based on a total affinity score of the subject user predicted for each of multiple candidate content items based on the predicted affinity scores of the subject user for each candidate component included in each candidate content item. For example, the total affinity score of the subject user for a candidate content item that includes several candidate components is predicted based on a sum of the affinity scores of the subject user predicted for its candidate components. In this example, the component selection module 235 may rank the candidate content items based on their associated total affinity scores and select the candidate components included in the highest ranked candidate content item for inclusion in the optimal content item. In embodiments in which the component selection module 235 selects components to include in the optimal content item based on a total affinity score of the subject user predicted for each of multiple candidate content items, each type of candidate component may be weighted differently. For example, candidate title components may be weighted more heavily than candidate body text components since online system users are more likely to read titles of content items than they are to read the body text of content items. The functionality of the component selection module 235 is further described below in conjunction with FIGS. 3-5.

Once the component selection module 235 has selected candidate components to be included in a training content item, the content item generator 240 generates (e.g., as shown in step 313 of FIG. 3) the training content item including the selected candidate components for presentation to one or more viewing users of the online system 140. The content item generator 240 may generate the training content item subject to one or more rules received from a content-providing user of the online system 140. For example, if the component selection module 235 has selected a candidate title component, a candidate image component, and a candidate body of text component, the content item generator 240 may generate the training content item according to a format provided in a rule received from a content-providing user of the online system 140. In this example, the rule may require that the candidate components be arranged vertically in the training content item, with the candidate title component at the top, followed by the candidate image component in the middle, which is followed by the candidate body of text component at the bottom. Each of the training content items may be stored by the online system 140 (e.g., in the content store 210 or in the ad request store 230).

Furthermore, once the component selection module 235 has selected the candidate components to include in an optimal content item, the content item generator 240 generates (e.g., as shown in step 350 of FIG. 3) the optimal content item for presentation to a subject user of the online system 140. For example, the content item generator 240 generates an optimal advertisement for presentation to a subject user that includes candidate components selected by the component selection module 235 that are associated with the highest affinity scores predicted for the subject user. The content item generator 240 may generate the optimal content item subject to one or more rules received from a content-providing user of the online system 140. In the above example, the candidate components are arranged within the optimal advertisement based on one or more rules received from an advertiser who provided the candidate components. The functionality of the content item generator 240 is further described below in conjunction with FIGS. 3 and 5.

The scoring module 245 retrieves historical performance information associated with training content items (e.g., from the action log 220). For example, the scoring module 245 retrieves information describing a number of viewing users of the online system 140 to whom a training content item was presented and a percentage of those viewing users who responded to a call to action associated with the training content item (e.g., clicked on the content item, made a purchase associated with the content item, etc.). The historical performance information associated with a training content item may include information describing candidate components included in the training content item. In the above example, in addition to information identifying a candidate call to action component, the scoring module 245 also may retrieve information identifying a candidate title component and a candidate image component included in the training content item.

The historical performance information may include information describing attributes associated with the viewing users to whom the training content items were presented. For example, the historical performance information associated with a training content item may be expressed based on different geographic locations associated with the viewing users (e.g., a number of viewing users in the U.S. to whom the training content item was presented and a percentage of those viewing users who responded to the call to action). Examples of attributes associated with viewing users include age, gender, geographic location, education level, occupation, actions performed in the online system 140, connections between the viewing users and additional users of the online system 140, or any other suitable attribute that may be used to describe a viewing user.

The scoring module 245 also may compute (e.g., as shown in step 318 of FIG. 3) affinity scores of viewing users for candidate components. The affinity score of a user for a candidate component is specific to the user in that it indicates the user's affinity for the candidate component. The scoring module 245 may compute affinity scores of viewing users for candidate components based on historical performance information associated with training content items including the candidate components. For example, the scoring module 245 computes an affinity score of a viewing user for a candidate component based on a set of interactions (e.g., none, click, share, etc.) by the viewing user with two training candidate content items previously presented to the viewing user that included the candidate component. In this example, the affinity score is high if the viewing user clicked on both of the training content items, low if the viewing user did not click on either of the training content items, and moderate if the viewing user clicked on only one of the training content items.

The affinity score associated with a candidate component may be expressed in various ways. In one embodiment, the affinity score is expressed as a numerical value. For example, the affinity score may be expressed on a scale of one to 10, with a score of 10 indicating the highest affinity and a score of 1 indicating the lowest affinity. In another embodiment, the affinity score is expressed in a more descriptive manner. For example, the affinity score may be expressed as "very low," "low," "medium," "high," or "very high."

The scoring module 245 predicts (e.g., as shown in step 340 of FIG. 3) an affinity score of a subject user of the online system 140 for each of one or more candidate components. The scoring module 245 may predict an affinity score of the subject user for a candidate component based on affinity scores associated with viewing users to whom training content items including the candidate component were previously presented who have at least a threshold measure of similarity to the subject user. For example, the scoring module 245 predicts an affinity score of the subject user for a candidate component based on affinity scores of viewing users for the candidate component, in which the viewing users have at least a threshold measure of similarity to the subject user.

The scoring module 245 may identify viewing users having at least a threshold measure of similarity to the subject user based on attributes shared by the viewing users and the subject user. For example, the scoring module 245 may determine that viewing users sharing at least two out of three attributes in common with the subject user (e.g., age, gender, and geographic location) have at least a threshold measure of similarity to the subject user. In various embodiments, when identifying viewing users having at least a threshold measure of similarity to the subject user, the scoring module 245 may associate different weights with different attributes, such that certain attributes are weighted more heavily than others. In the above example, if the scoring module 245 weights geographic location more heavily than either age or gender, the scoring module 245 may determine that a greater measure of similarity exists between the subject user and a viewing user who only share the attribute of geographic location than exists between the subject user and a viewing user who only share the attribute of age or gender.

In some embodiments, the scoring module 245 may predict the affinity score of the subject user for each of one or more candidate components based on features specific to the candidate component. For example, the scoring module 245 predicts an affinity score of the subject user for a candidate image component based on features specific to candidate image components (e.g., image contents, image resolution, image size, etc.) using historical performance information associated with training content items including candidate components that are associated with these features. The scoring module 245 may account for one or more rules received from the content-providing user when predicting an affinity score of the subject user for a candidate component. For example, if a rule received from an advertiser restricts presentation of particular candidate image components to subject users who are at least 21 years old, the scoring module 245 does not predict an affinity score of the subject user for these candidate image components if the subject user is not at least 21 years old.

In some embodiments, the scoring module 245 predicts the affinity score of the subject user for one or more candidate components using a machine-learned model. For example, the scoring module 245 uses a machine-learned model to predict the affinity score of the subject user for one or more candidate components based on affinity scores associated with viewing users to whom training content items including the candidate components were previously presented and who have at least a threshold measure of similarity to the subject user (e.g., based on attributes shared by the viewing users and the subject user). In this example, the affinity score of the subject user for a candidate component may be proportional to the affinity scores associated with the viewing users having at least the threshold measure of similarity to the subject user. In the above example, the scoring module 245 also may use the machine-learned model to predict the affinity score of the subject user for the candidate component based on affinity scores associated with viewing users to whom training content items were previously presented, in which the training content items included candidate components with features (e.g., font type, image size, etc.) having at least a threshold measure of similarity to features associated with the candidate component. The functionality of the scoring module 245 is further described below in conjunction with FIGS. 3 and 5.

In various embodiments, the machine-learning module 250 may train (e.g., as shown in step 330 of FIG. 3) a machine-learned model to predict an affinity score of a subject user for one or more candidate components. The machine-learning module 250 may train the model using affinity scores of viewing users of the online system 140 for candidate components included in training content items presented to the viewing users and information describing each of the viewing users. For example, the machine-learning module 250 trains the model using affinity scores of a viewing user of the online system 140 for each candidate component included in a training content item presented to the viewing user and information describing attributes associated with the viewing user (e.g., age and gender). The machine-learning module 250 may retrain the model periodically or as new performance information associated with training content items becomes available (e.g., upon every 5,000 impressions of training content items including a candidate component). The functionality of the machine-learning module 250 is further described below in conjunction with FIG. 3.

The content selection module 255 selects (e.g., as shown in step 365 of FIG. 3) one or more content items for communication to a client device 110 to be presented to a user. Content items eligible for presentation to the user are retrieved from the content store 210, from the ad request store 230, or from another source by the content selection module 255, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 255 includes content items eligible for presentation to the user in one or more content selection processes, which identify a set of content items for presentation to the viewing user. For example, the content selection module 255 determines measures of relevance of various content items to the user based on characteristics associated with the user by the online system 140 and based on the user's affinity for different content items. Based on the measures of relevance, the content selection module 255 selects content items for presentation to the user. As an additional example, the content selection module 255 selects content items having the highest measures of relevance or having at least a threshold measure of relevance for presentation to the user. Alternatively, the content selection module 255 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 255 may use the bid amounts associated with ad requests when selecting content for presentation to a user. In various embodiments, the content selection module 255 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of a user presented with the ad content from the ad request interacting with the ad content. The content selection module 255 may rank ad requests based on their associated bid amounts and select ad requests having at least a threshold position in the ranking for presentation to a user. In some embodiments, the content selection module 255 ranks both content items not associated with bid amounts and ad requests in a unified ranking based on bid amounts associated with ad requests and measures of relevance associated with content items and ad requests. Based on the unified ranking, the content selection module 255 selects content for presentation to the user. Selecting ad requests and other content items through a unified ranking is further described in U.S. patent application Ser. No. 13/545,266, filed on Jul. 10, 2012 (U.S. Publication No. US2014/0019261 A1, published on Jan. 16, 2014), which is hereby incorporated by reference in its entirety.

For example, the content selection module 255 receives a request to present a feed of content to a user of the online system 140. The feed may include one or more advertisements as well as content items, such as stories describing actions associated with other online system users connected to the user. The content selection module 255 accesses one or more of the user profile store 205, the content store 210, the action log 220, and the edge store 225 to retrieve information about the user. For example, stories or other data associated with users connected to the identified user are retrieved. Additionally, one or more ad requests may be retrieved from the ad request store 230. The retrieved stories, ad requests, or other content items, are analyzed by the content selection module 255 to identify candidate content that is likely to be relevant to the identified user. For example, stories associated with users not connected to the identified user or stories associated with users for which the identified user has less than a threshold affinity are discarded as candidate content. Based on various criteria, the content selection module 255 selects one or more of the content items or ad requests identified as candidate content for presentation to the identified user. The selected content items or ad requests may be included in a feed of content that is presented to the user. For example, the feed of content includes at least a threshold number of content items describing actions associated with users connected to the user via the online system 140.

In various embodiments, the online system 140 presents content to a user through a newsfeed including a plurality of content items selected for presentation to the user. One or more advertisements also may be included in the feed. The content selection module 255 may determine the order in which selected content items or advertisements are presented via the feed. For example, the content selection module 255 orders content items or advertisements in the feed based on likelihoods of the user interacting with various content items or advertisements.

The user interface module 260 generates a user interface including one or more content items to be presented to users of the online system 140. The user interface module 260 may include one or more content items selected by the content selection module 255 in a user interface to be presented to users of the online system 140. For example, the user interface module 260 may generate a feed of content items (e.g., a newsfeed) that includes one or more content items and one or more advertisements selected by the content selection module 255, which the online system 140 presents in a display area of a mobile device associated with a viewing user. As an additional example, the user interface module 260 may include an optimal advertisement in a display unit that is subsequently presented along the right side of a display area of a client device 110 associated with a subject user. The functionality of the user interface module 260 is further described below in conjunction with FIG. 3.

The web server 265 links the online system 140 via the network 120 to the one or more client devices 110, as well as to the third party system 130 and/or one or more third party systems. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Generating Data to Predict User Affinity for a Content Item Component

Figure 3:
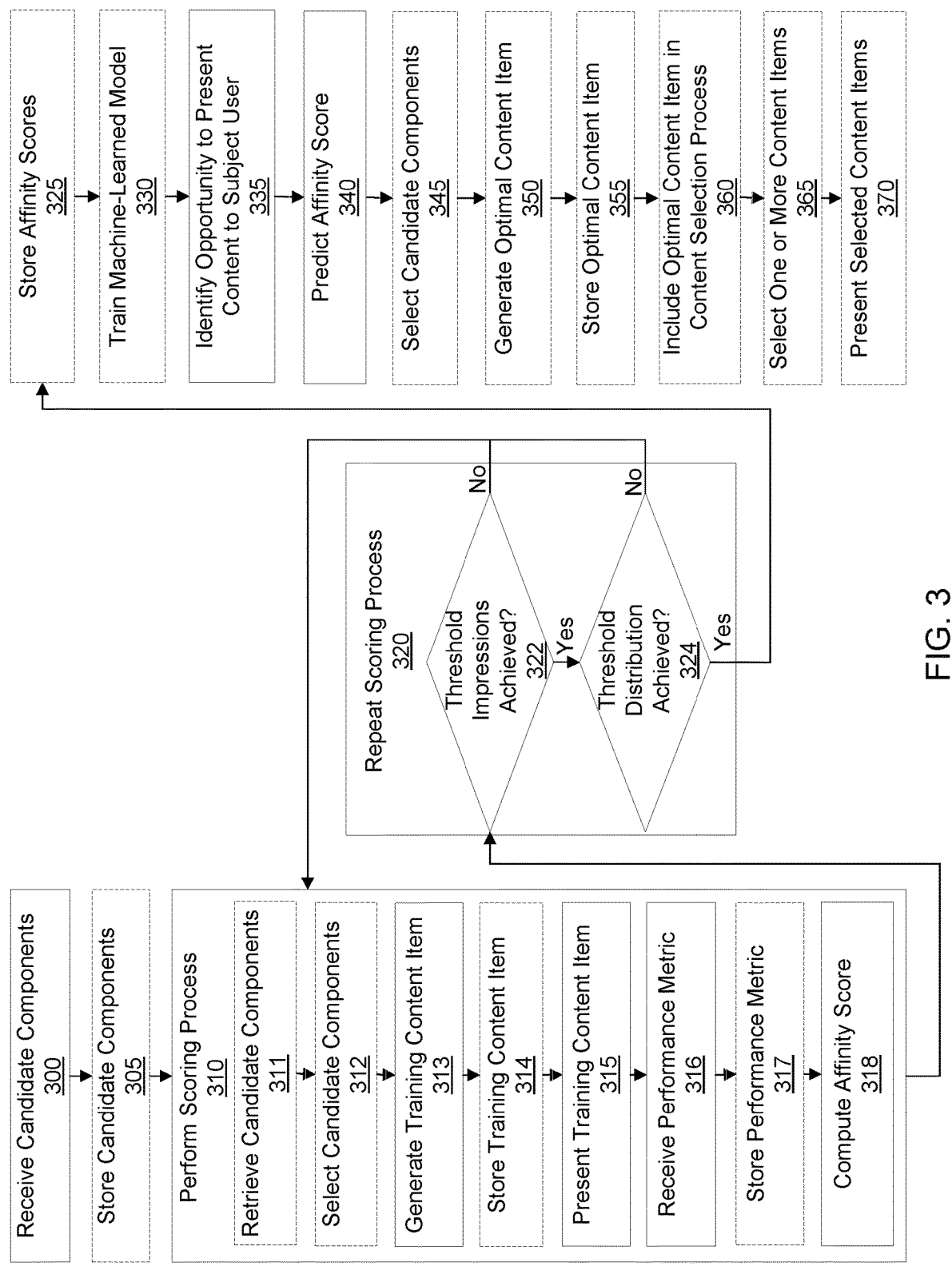
FIG. 3 is a flow chart of a method for generating data to predict an affinity of a subject user of an online system for one or more candidate content item components to be included in an optimal content item, in accordance with an embodiment.

FIG. 3 is a flow chart of a method for generating data to predict an affinity of a subject user of an online system for one or more candidate components to be included in an optimal content item according to one embodiment. In other embodiments, the method may include different and/or additional steps than those shown in FIG. 3. Additionally, steps of the method may be performed in a different order than the order described in conjunction with FIG. 3.

The online system 140 receives 300 a plurality of candidate components for including in a content item. The candidate components received 300 by the online system 140 are of at least one type (e.g., title, image, body text, call to action, video, etc.). The candidate components may be received 300 from a content-providing user of the online system 140 (e.g., an advertiser). For example, the online system 140 receives 300 multiple candidate title components and multiple candidate video components from an advertiser for including in an advertisement. Each candidate component may be associated with information that identifies a type associated with the candidate component (e.g. title, image, etc.) and/or an identifier that uniquely identifies the candidate component.

In some embodiments, in addition to the plurality of candidate components, the online system 140 also may receive one or more rules from a content-providing user. The rules received from the content-providing user may describe how the candidate components may or may not be combined in a content item, a format or arrangement of candidate components within the content item, etc. For example, a rule may require that a content item include exactly one candidate title component and at least one candidate call to action component. As an additional example, a rule may require that a content item include no more than two candidate video components and that a candidate title component appear at the top of each content item.

In various embodiments, the online system 140 may store 305 the plurality of candidate components. For example, an object representing each candidate component may be stored 305 in the content store 210 or in the ad request store 230. Each object representing a candidate component may be stored 305 in association with information that identifies a type (e.g., title, image, video, etc.) associated with the candidate component and/or an identifier that uniquely identifies the candidate component. For example, an object representing a candidate image component may be stored 305 in association with an image hash that may be used to identify the candidate image component. An object representing a candidate component may be stored 305 in association with additional types of information, such as information identifying the content-providing user from whom the online system 140 received 305 the candidate component and one or more rules received from the content-providing user.

The online system 140 performs 310 a scoring process for a set of the plurality of candidate components. In embodiments in which the online system 140 stores 305 the plurality of candidate components, the online system 140 may retrieve 311 (e.g., using the component selection module 235) the set of candidate components. For example, the component selection module 235 may retrieve 311 objects representing the set of candidate components from the content store 210 or from the ad request store 230. The set of candidate components may be of various types. For example, the component selection module 235 may retrieve 311 candidate components including titles, images, bodies of text, calls to action, videos, audio clips, and other types of data that may be included in an advertisement or other content item to be presented to one or more viewing users of the online system 140.

In various embodiments, the scoring process includes selecting 312 (e.g., using the component selection module 235) the set of candidate components to include in a training content item to be presented to one or more viewing users of the online system 140. The component selection module 235 may select 312 the set of candidate components to include in the training content item subject to one or more rules received from a content-providing user of the online system 140. For example, a rule may require that training content items conform to a specific format, such that a candidate title component must be included at the top of each training content item. As an additional example, if a rule requires that a content item include exactly one title, one image, and one body of text, the set of the plurality of candidate components selected 312 by the component selection module 235 may include one of each of the types of required components.

In some embodiments, the component selection module 235 selects 312 the set of candidate components to include in the training content item by randomly selecting 312 the set of candidate components. In the above example, the component selection module 235 may randomly select 312 each of the candidate components of the set of the plurality of candidate components to include in the training content item, such that each candidate component of each of the types of required components has an equal chance of being selected 312 by the component selection module 235.

The component selection module 235 also may select 312 the set of candidate components to include in the training content item using a heuristic. For example, the component selection module 235 uses Thompson sampling to select 312 each of the set of candidate components included in the training content item based on a distribution of affinity scores for each candidate component, in which the distribution of affinity scores for a candidate component is inversely proportional to the amount of data for the candidate component (i.e., the number of impressions achieved by training content items including the candidate component that were previously presented to viewing users of the online system 140). As an additional example, Thompson sampling may be performed on a Beta function based on a number of hits (e.g., conversions or clicks) and a number of misses (e.g., impressions that do not achieve conversions or clicks) associated with candidate components included in training content items presented to viewing users of the online system 140.

Once the component selection module 235 has selected 312 the set of candidate components to be included in the training content item, the online system 140 generates 313 (e.g., using the content item generator 240) the training content item including the selected 312 set of candidate components for presentation to one or more viewing users of the online system 140. The content item generator 240 may generate 313 the training content item subject to one or more rules received from a content-providing user of the online system 140. For example, if the component selection module 235 has selected 312 a candidate title component, a candidate image component, and a candidate body of text component, the content item generator 240 may generate 313 the training content item according to a format provided in a rule received from a content-providing user of the online system 140. In this example, the rule may require that the candidate components be arranged vertically in the training content item, with the candidate title component at the top, followed by the candidate image component in the middle, which is followed by the candidate body of text component at the bottom.

Once generated 313, the training content item may be stored 314 by the online system 140. For example, an object representing the content item may be stored 314 in the content store 210, while an object representing a training advertisement may be stored 314 in the ad request store 230. An object representing the training content item may be stored 314 in association with information that uniquely identifies the training content item (e.g., an identifier). In some embodiments, an object representing the training content item may include additional objects representing each candidate component included in the training content item, which also may be stored 314 in the content store 210 or in the ad request store 230. For example, an object representing a training content item is a container object that contains other objects representing the candidate components of the training content item, all of which are stored 314 in the content store 210.

Additional types of information may be stored 314 in association with an object representing the training content item in the content store 210. Examples of additional types of information that may be stored 314 in association with an object representing a training content item include information identifying a content-providing user who provided the set of candidate components included in the training content item, information identifying types of candidate components included in the training content item, one or more rules received from the content-providing user (e.g., rules describing how candidate components may or may not be combined with other candidate components in the training content item), etc. Similar types of information may be stored 314 in association with an object representing a training advertisement in the ad request store 230.

The scoring process also may include presenting 315 the training content item to one or more viewing users of the online system 140. The online system 140 may present 315 a training content item generated 313 by the content item generator 240 to a viewing user in a display area of a client device 110 associated with the viewing user. For example, the user interface module 260 may generate a feed of content items (e.g., a newsfeed) that includes the training content item, which the online system 140 presents 315 in a display area of a mobile device associated with a viewing user.

In some embodiments, the scoring process also includes receiving 316 information describing a performance metric associated with each impression of the training content item. The performance metric may describe impressions achieved by the training content item, clicks on the training content item, conversions associated with the training content item (e.g., number of viewing users who responded to a call to action associated with the training content item), and any other suitable metric that may be used to measure the performance of a content item. For example, the online system 140 receives 316 (e.g., at the action logger 215) information describing an impression of the training content item for a viewing user of the online system 140 and a click or other type of interaction with the training content item by the viewing user.

The information describing the performance metric may include information describing one or more attributes associated with each of the viewing users to whom the training content item was presented 315. Attributes associated with a viewing user may include demographic information, information describing connections between the viewing user and additional users of the online system 140, information describing actions performed by the viewing user in the online system 140, or any other suitable characteristics associated with the viewing user. For example, the information received 316 by the action logger 215 may include an age, gender, and geographic location associated with the viewing user.

Information describing the performance metric associated with a training content item may include information identifying one or more candidate components included in the training content item. The performance of a training content item including a candidate component may be tracked by the online system 140 using a tracking mechanism that identifies candidate components included in the training content item. For example, tracking mechanisms that may be used to identify a candidate component include a tracking pixel, a digital watermark, or an image hash associated with the candidate component.

The information describing the performance metric also may include additional types of information, such as information identifying types of candidate components included in the training content item (e.g., title, text, image, etc.), information identifying the specific training content item (e.g., based on an identifier associated with the training content item), a time of the impression and/or interaction with the training content item by a viewing user (e.g., based on a timestamp associated with each event), etc. In various embodiments, the information describing the performance metric also may include information identifying the content-providing user who provided the set of candidate components included in the training content item. Furthermore, the information describing the performance metric may include one or more rules received from the content-providing user. For example, a rule may describe how candidate components may or may not be combined with other candidate components in the training content item.

The information describing the performance metric associated with each impression of the training content item may be stored 317 in association with information describing attributes associated with the viewing users to whom the training content item was presented 315 (e.g., by the action logger 215 in the action log 220). For example, the action log 220 stores 317 performance metrics describing a number of viewing users associated with different age groups and genders to whom the training content item was presented 315 and a percentage of the viewing users associated with different age groups and genders who performed an action specified by a call to action associated with the training content item (e.g., purchasing a product associated with the training content item after clicking through the training content item). In this example, the action log 220 also may store 317 the performance metrics in association with information identifying the training content item as well as each of its candidate components.

The information describing the performance metric associated with each impression of the training content item also or alternatively may be stored 317 in the content store 210 or in the ad request store 230. For example, an object representing a candidate component of the training content item may be stored 317 in the content store 210 in association with information describing a viewing user of the online system 140 (e.g., user identifier or attributes) to whom the training content item including the candidate component was presented 315, a time associated with the presentation (e.g., a timestamp), a type of interaction by the viewing user with the training content item (e.g., none, click, conversion, etc.), and a time of interaction by the viewing user with the training content item, if any.

The scoring process may further include computing 318 an affinity score of each viewing user for each of the set of the candidate components. The online system 140 may compute 318 (e.g., using the scoring module 245) affinity scores indicating affinities of viewing users for each of the set of candidate components based at least in part on the information describing the performance metric associated with each impression of the training content item including the set of candidate components. For example, an affinity score indicating an affinity of a viewing user of the online system 140 for a candidate component is computed 318 based on a set of interactions by the viewing user with the training candidate content item that includes the candidate component (e.g., none, click, share, etc.). In this example, the affinity score computed 318 for the candidate component is high if the viewing user made a purchase associated with the training content item after clicking on the training content item, low if the viewing user did not click on the training content item, and moderate if the viewing user clicked on, but did not make a purchase associated with the training content item.

The affinity score associated with a candidate component may be expressed in various ways. In one embodiment, the affinity score is expressed as a numerical value (e.g., on a scale of one to 10, with a score of 10 indicating the highest affinity and a score of one indicating the lowest affinity). In another embodiment, the affinity score is expressed in a more descriptive manner (e.g., very low, low, medium, high, or very high).

Each affinity score associated with a candidate component is associated with attributes associated with each viewing user to whom the training content item including the candidate component was presented 315. For example, the scoring module 245 retrieves information stored in the action log 220 and user profile store 205 describing attributes associated with each viewing user of the online system 140 to whom the training content item was presented 315 and information describing each candidate component included in the training content item (e.g., from the content store 210). In this example, the scoring module 245 computes 318 an affinity score associated with each candidate component and associates each affinity score with an age, gender, and education level associated with each viewing user presented 315 with the training content item.

Figure 4:
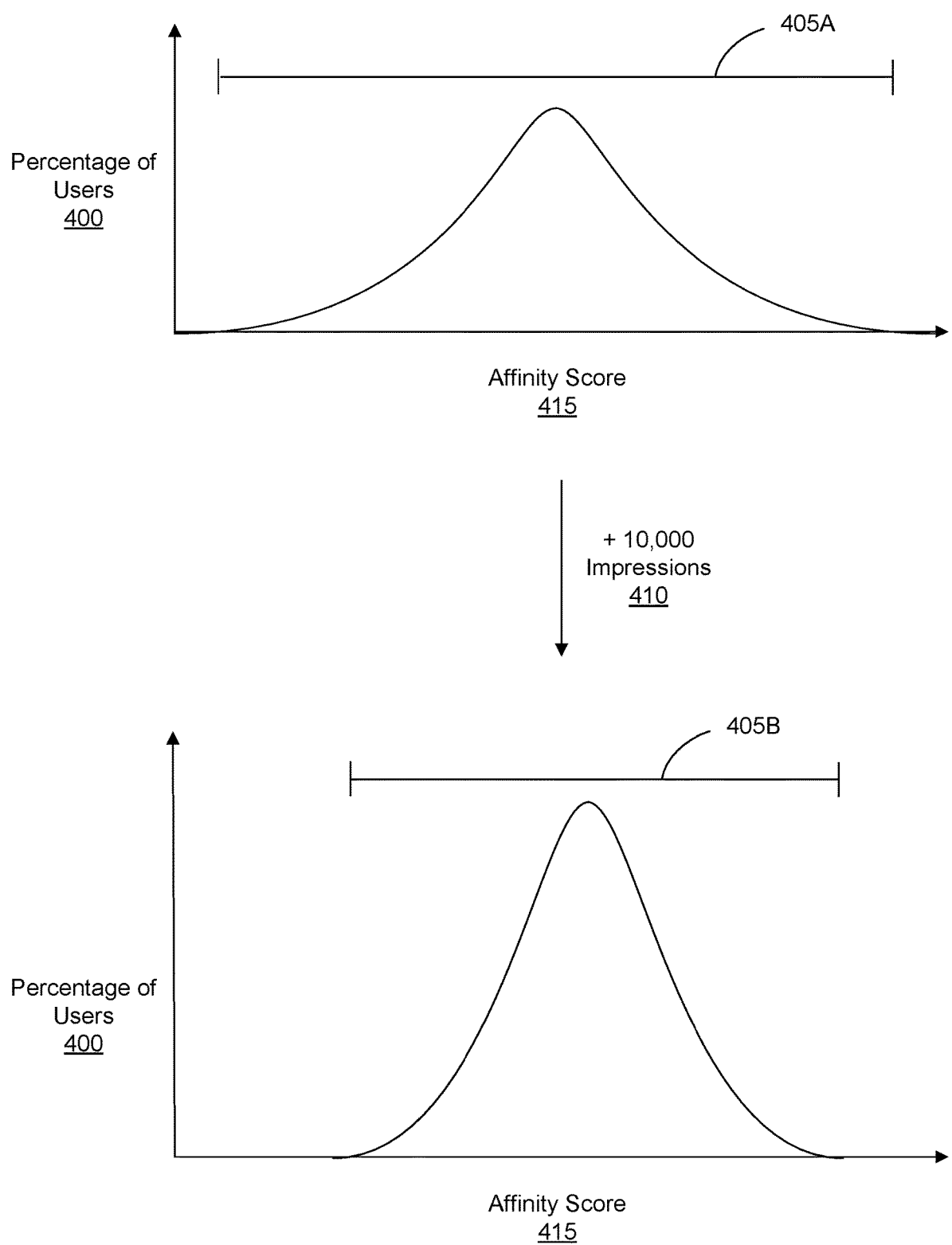
FIG. 4 is an example of a distribution of affinity scores for a candidate component before and after using a heuristic to select the candidate component for inclusion in training content items, in accordance with an embodiment.

The online system 140 repeats 320 the scoring process for a different set of the plurality of candidate components based at least in part on a heuristic. The heuristic is based at least in part on a distribution of a set of affinity scores computed for each of the plurality of candidate content item components. For example, the component selection module 235 may use Thompson sampling to select a different set of candidate components to include in a different training content item based on a distribution of affinity scores for each candidate component, in which the distribution of affinity scores for a component is inversely proportional to the amount of data for the component. For example, as shown in FIG. 4, the distribution 405A of affinity scores 415 for a candidate component may initially be very wide for different percentages of online system users 400 to whom training content items including the candidate component were presented 315. However, once several additional impressions (e.g., 10,000 additional impressions) have been achieved 410 by training content items including the candidate component, the distribution 405B of affinity scores 415 for the candidate component becomes more narrow.

Referring back to FIG. 3, in some embodiments, the online system 140 may repeat 320 the scoring process for different sets of the plurality of candidate components until a stopping point is reached. The stopping point may be reached once one or more conditions are satisfied. In various embodiments, the online system 140 may repeat 320 the scoring process until at least a threshold number of impressions have been achieved 322 by generating 313 training content items including different sets of the plurality of candidate components. For example, the content item generator 240 generates 313 training content items that include randomly selected 312 candidate components and the online system 140 performs 310 the remainder of the scoring process for the training content items until the training content items have achieved 322 at least 1,000 impressions.

In some embodiments, the online system 140 may repeat 320 the scoring process until at least a threshold distribution of affinity scores has been achieved 322 for one or more of the plurality of candidate components. For example, once the training content items that include randomly selected 312 candidate components have achieved 322 at least 1,000 impressions in the previous example, the content item generator 240 generates 313 training content items that include candidate components that are selected 312 using Thompson sampling. Here, Thompson sampling may be performed on each type of candidate component for various groups of viewing users of the online system 140 (e.g., viewing users who are 13 to 17 years old, viewing users who are 18 to 25 years old, etc.). In this example, the online system 140 repeats 320 the scoring process until the distribution of affinity scores for each component for each group of viewing users is less than a threshold distribution, at which point the online system 140 stops repeating 320 the scoring process. The component selection module 235 may use the heuristic to select 312 candidate components to include in a training content item without having previously generated 313 training content items from randomly selected 312 candidate components. In the above example, the component selection module 235 may perform Thompson sampling on a Beta function that initially assumes a particular click-through rate and/or impression probability associated with each candidate component.

The online system 140 may store 325 the affinity scores of the viewing users computed for each candidate component. The affinity scores associated with viewing users of the online system 140 may be stored 325 in association with user profiles associated with the viewing users. For example, the affinity score computed 318 for a viewing user for a candidate component is stored 325 in the user profile store 205 in association with information identifying the viewing user and information identifying the candidate component.

A machine-learned model may be trained 330 using the affinity scores of the viewing users for each candidate component to predict an affinity score of a subject user for each candidate component. The online system 140 may train 330 (e.g., using the machine-learning module 250) the model using affinity scores associated with viewing users of the online system 140 to whom training content items were previously presented 315 and information describing each viewing user of the online system 140 associated with each of the affinity scores. For example, the machine-learning module 250 trains 330 the model using affinity scores for candidate components included in various training content items presented 315 to viewing users of the online system 140 and information describing attributes associated with the viewing users (e.g., age, gender, and occupation). The machine-learning module 250 may retrain the model periodically or as new performance information associated with training content items becomes available (e.g., upon every 1,000 impressions of training content items including a candidate component).

The online system 140 identifies 335 an opportunity to present content to a subject user of the online system 140. For example, the online system 140 identifies 335 an opportunity to present content to the subject user upon receiving a request from the subject user to present a feed of content in a display area of a client device 110 associated with the subject user.

Once the online system 140 has identified 335 an opportunity to present content to the subject user, the online system 140 predicts 340 (e.g., using the scoring module 245) an affinity score of the subject user for each of the plurality of candidate components. The scoring module 245 predicts 340 an affinity score of the subject user for each candidate component based on the affinity scores associated with the viewing users to whom training content items including the candidate component were previously presented 315 who have at least a threshold measure of similarity to the subject user. For example, the affinity scores associated with viewing users having at least a threshold measure of similarity to the subject user are used to predict 340 an affinity score of a subject user for each of the plurality of candidate components that were included in training content items that were previously presented 315 to the viewing users. The affinity score of the subject user for a candidate component is specific to the subject user in that it indicates the subject user's predicted affinity for the candidate component.

The scoring module 245 may identify viewing users having at least a threshold measure of similarity to the subject user based on attributes shared by the viewing users and the subject user. For example, the scoring module 245 may determine that viewing users sharing at least 75% of attributes in common with the subject user (e.g., age, gender, geographic location, and education level) have at least a threshold measure of similarity to the subject user. In various embodiments, when identifying viewing users having at least a threshold measure of similarity to the subject user, the scoring module 245 may associate different weights with different attributes, such that certain attributes are weighted more heavily. For example, if the scoring module 245 weights the attribute of occupation more heavily than the attributes of age, gender, or geographic location, the scoring module 245 may determine that a greater measure of similarity exists between the subject user and a viewing user who only share the same occupation than exists between the subject user and a viewing user who only share the same age, gender, or geographic location.

In some embodiments, the scoring module 245 may predict 340 the affinity score of the subject user for each of one or more candidate components based on features specific to the candidate component. For example, the scoring module 245 predicts 340 an affinity score of the subject user for a candidate title component based on features specific to candidate title components (e.g., font type, font color, font size, title length, character spacing, etc.) using historical performance information associated with training content items including candidate components that are associated with these features. The scoring module 245 may account for one or more rules received from the content-providing user when predicting 340 an affinity score of the subject user for a candidate component. For example, if a rule received from an advertiser restricts presentation of particular candidate image components to subject users who are at least 18 years old, the scoring module 245 does not predict 340 an affinity score of the subject user for these candidate image components if the subject user is not at least 18 years old.

In some embodiments, the scoring module 245 predicts 340 the affinity score of the subject user for each candidate component using a machine-learned model (e.g., trained by the machine-learning module 250). For example, the scoring module 245 uses the machine-learned model to predict 340 the affinity score of the subject user for each candidate component based on affinity scores associated with viewing users to whom training content items including the candidate component were previously presented 315 who have at least a threshold measure of similarity to the subject user (e.g., based on attributes shared by the viewing users and the subject user). In this example, the affinity score of the subject user for a candidate component may be proportional to the affinity scores associated with the viewing users having at least a threshold measure of similarity to the subject user. In the above example, the scoring module 245 also may use the machine-learned model to predict 340 the affinity score of the subject user for the candidate component based on affinity scores associated with viewing users to whom training content items were previously presented 315, in which the training content items included candidate components with features (e.g., font type, image size, etc.) having at least a threshold measure of similarity to features associated with the candidate component.

The online system 140 may select 345 (e.g., using the component selection module 235) one or more candidate components based at least in part on an affinity score of the subject user predicted 340 for each candidate component. For example, the component selection module 235 selects 345 the candidate components that are associated with the highest affinity scores predicted 340 for the subject user (e.g., by ranking various types of candidate components based on their affinity scores and selecting 345 the highest ranked candidate component of each type). The component selection module 235 may select 345 the candidate components subject to one or more rules received from a content-providing user of the online system 140. A rule received from the content-providing user of the online system 140 may describe how candidate components provided by the content-providing user may or may not be combined in a content item, an arrangement of the candidate components within the content item, etc. For example, if a rule received from an advertiser requires that an advertisement include exactly one title component and two video components, the component selection module 235 may select 345 one title component and two video components associated with the highest affinity scores.

In some embodiments, the component selection module 235 selects 345 components based on a marginal effect each candidate component has on the probability that the subject user will perform an interaction with the optimal content item. For example, if each of several candidate components is associated with an affinity score that indicates the subject user's predicted click-through rate for a content item including the candidate component, the difference between a pair of affinity scores indicates a marginal effect on the predicted click-through rate for the content item based on whether the content item includes one candidate component of the pair or the other candidate component of the pair. In this example, the component selection module 235 may identify multiple pairs of candidate components and select 345 the candidate component responsible for the greatest marginal improvement in the subject user's predicted click-through rate.

The component selection module 235 may use an independent selection process to select 345 each type of candidate component. For example, to select 345 a title component and an image component, the component selection module 235 ranks all candidate title components based on their associated affinity scores and selects 345 the highest ranked candidate title component. In this example, the component selection module 235 also ranks all candidate image components in a separate ranking and selects 345 the highest ranked candidate image component.

In various embodiments, the component selection module 235 selects 345 components based on a total affinity score of the subject user predicted for each of multiple candidate content items based on the predicted affinity scores of the subject user for each candidate component included in each candidate content item. For example, the total affinity score of the subject user for a candidate content item that includes several candidate components is predicted based on a sum of the affinity scores of the subject user predicted for its candidate components, in which the affinity score for each type of candidate component is weighted differently. As an additional example, in embodiments in which the online system 140 receives one or more rules from a content-providing user, the component selection module 235 selects 345 candidate components subject to the rules and uses a machine-learned model to predict a total affinity score of the subject user for each candidate content item based on a sum of the affinity scores of the subject user predicted for its candidate components. The component selection module 235 may rank the candidate content items in the above example based on their associated total affinity scores and select 345 the candidate components included in the highest ranked candidate content item.

Figure 5:
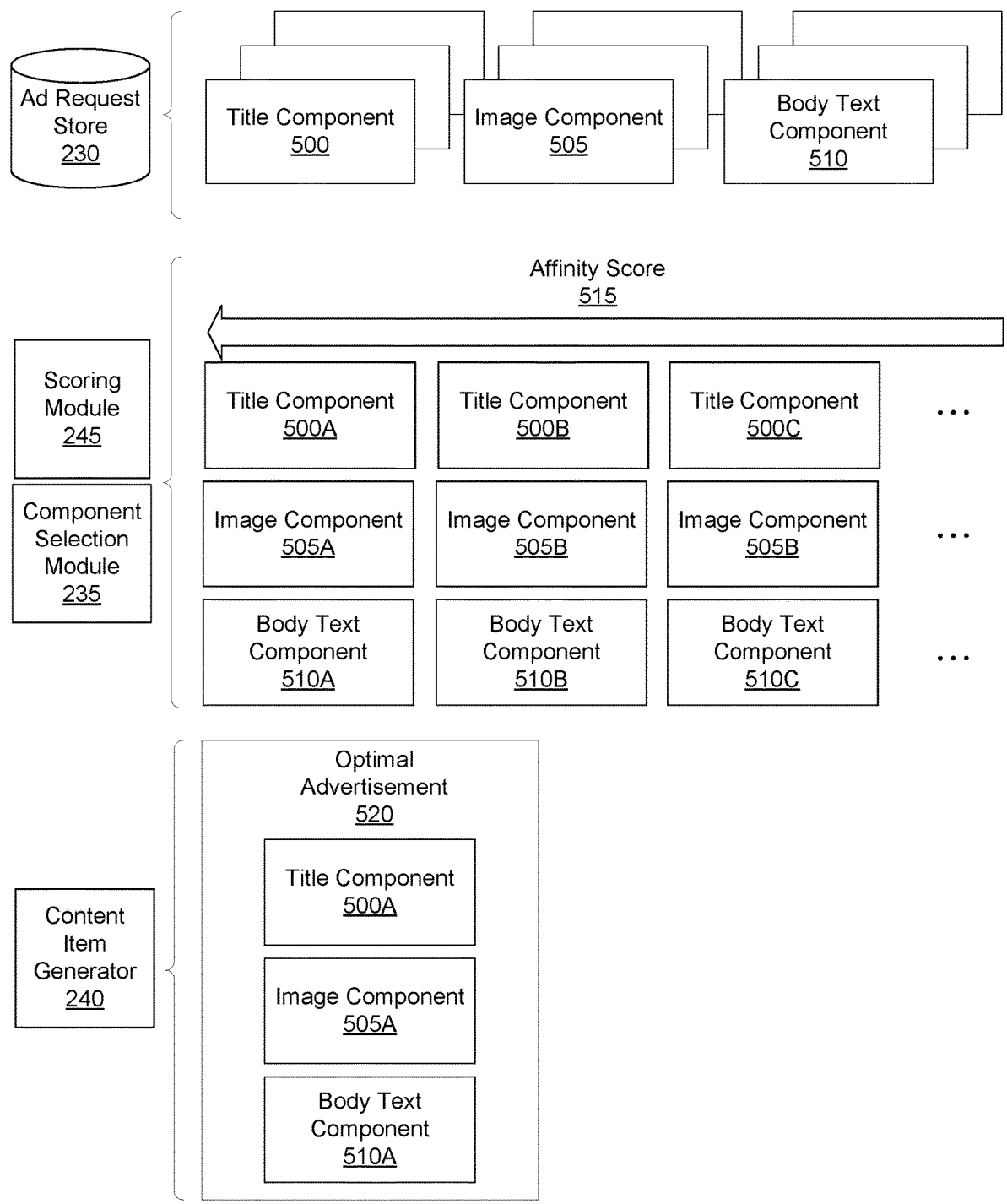
FIG. 5 is a conceptual diagram of a method for selecting one or more candidate components to be included in an optimal content item, in accordance with an embodiment.

The online system 140 may generate 350 (e.g., via the content item generator 240) an optimal content item for presentation to the subject user that includes the selected 345 candidate components. A content item is optimal if it includes a particular candidate component or a particular combination of candidate components selected 345 specifically for a subject user, such that the likelihood that the subject user will perform an interaction with the content item when presented with the content item is maximized. For example, as illustrated in FIG. 5, an optimal advertisement 520 is generated 350 by first retrieving one or more candidate title components 500, one or more candidate image components 505, and one or more candidate body text components 510 from the ad request store 230. The scoring module 245 then predicts 340 the affinity score 515 of the subject user for each of the candidate components 500-510. The component selection module 235 may select 345 one candidate component of each type to maximize the likelihood that the subject user will click on the optimal advertisement when it is presented to the subject user. In this example, the likelihood that the subject user will click on the optimal advertisement 520 is maximized since the component selection module 235 ranks multiple candidate components of each type 500-510 based on their affinity scores 515 and selects 345 the candidate title component 500A, candidate image component 505A, and candidate body text component 510A associated with the highest affinity scores 515. The selected 345 candidate components are then included in the optimal advertisement 520 generated 350 by the content item generator 240.

Referring once more to FIG. 3, in various embodiments, the online system 140 may store 355 objects representing the optimal content item (e.g., in the content store 210 or in the ad request store 230). An object representing the optimal content item may be stored 355 in association with information (e.g., an identifier) that uniquely identifies the optimal content item. Similar to the training content items, in some embodiments, an object representing an optimal content item may include additional objects representing each candidate component included in the optimal content item, which also may be stored 355 in the content store 210 or in the ad request store 230. Furthermore, the content store 210 or ad request store 230 also may include additional types of information that is stored 355 in association with each object representing an optimal content item (e.g., information identifying the content-providing user who provided a candidate component included in the optimal content item, information identifying types of candidate components included in the optimal content item, one or more rules received from the content-providing user, information associated with the subject user to whom the optimal content item is to be presented, etc.).

The optimal content item may be included 360 in a content selection process (e.g., an auction) that selects one or more content items for presentation to the subject user. For example, the online system 140 includes 360 an optimal advertisement in an advertisement auction that ranks the optimal advertisement among one or more additional advertisements based on a bid amount associated with each advertisement.

The online system 140 may select 365 (e.g., using the content selection module 255) one or more content items for presentation to the subject user. In the above example, the content selection module 255 selects 365 the advertisement associated with the highest bid amount for presentation to the subject user. In addition to a bid amount, the content selection module 255 may rank the optimal content item among additional content items based on various additional factors as well. Examples of such factors include a quality of each content item, a predicted affinity of the subject user for each content item, etc.

The content item(s) selected 365 by the content selection module 255 may be presented 370 to the subject user. For example, the user interface module 260 may generate a display unit that includes the content items selected 365 by the content selection module 255. In this example, the online system 140 may present 370 the display unit along the right side of a display area of a client device 110 associated with the subject user.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, a plurality of candidate content item components for including in one or more content items to be presented to a plurality of viewing users of the online system;
performing a scoring process for a set of the plurality of candidate content item components, the scoring process comprising:
generating a training content item comprising the set of the plurality of candidate content item components;
presenting the training content item to one or more viewing users of the online system, wherein the training content item is included in a feed of content items presented to each viewing user via a user interface of the online system;
receiving information describing a performance metric associated with each impression of the training content item, the information comprising one or more attributes associated with each of the one or more viewing users to whom the training content item was presented; and
computing an affinity score of each of the one or more viewing users for each of the set of the plurality of candidate content item components based at least in part on the information describing the performance metric associated with each impression of the content item, the affinity score associated with the one or more attributes associated with each of the one or more viewing users to whom the training content item was presented;
for each of a plurality of sets of candidate content item components, each set different from one another, repeating the scoring process until a distribution of affinity scores computed for each of the plurality of candidate content item components is less than a threshold distribution, wherein the different set of the plurality of candidate content items is selected using a heuristic;
identifying an opportunity to present content to a subject user of the online system, the subject user associated with one or more additional attributes;
identifying one or more of the plurality of candidate content item components eligible to be included in an optimal content item for presentation to the subject user, eligibility based on targeting criteria associated with the optimal content item;
predicting, using a machine-learned model, an affinity score of the subject user for each of the one or more candidate content item components based at least in part on the affinity scores for the set of the plurality of candidate content item components, the one or more attributes associated with the viewing users, and the one or more additional attributes associated with the subject user;
assembling the optimal content item to present to the subject user, the assembling based on the affinity score of the subject user for each of the one or more candidate content item components and the optimal content item comprising the one or more candidate content item components; and
presenting the assembled optimal content item to the subject user on a side of the user interface of the online system.

2. The method of claim 1, wherein the heuristic comprises Thompson Sampling on a function, the function based at least in part on a number of impressions achieved by one or more training content items comprising each of the plurality of candidate content item components.

3. The method of claim 1, wherein the heuristic comprises Thompson Sampling on a function, the function based at least in part on an assumption about a number of impressions achieved by one or more training content items comprising each of the plurality of candidate content item components.

4. The method of claim 1, wherein the distribution of the affinity scores computed for each of the plurality of sets of candidate content item components is inversely proportional to a number of impressions achieved by one or more training content items comprising each of the plurality of candidate content item components.

5. The method of claim 1, wherein a subset of the set of the plurality of candidate content item components is randomly selected from the plurality of candidate content item components.

6. The method of claim 1, wherein repeating the scoring process for the different set of the plurality of candidate content item components is further based at least in part on achieving at least a threshold number of impressions of one or more training content items comprising one or more of the plurality of candidate content item components.

7. The method of claim 1, wherein the plurality of candidate content item components comprises one or more types of candidate content item components.

8. The method of claim 7, wherein the one or more types of candidate content item components are selected from a group consisting of: an image component, a call to action component, a video component, an audio component, a title component, a body component, and any combination thereof.

9. The method of claim 1, wherein the one or more attributes associated with the viewing users and the one or more additional attributes associated with the subject user have at least a threshold measure of similarity to each other.

10. The method of claim 1, wherein the training content item is generated subject to one or more rules received from a content-providing user of the online system from which the plurality of candidate content item components was received.

11. The method of claim 1, further comprising:
storing the affinity score of each of the one or more viewing users for each of the sets of the plurality of candidate content item components.

12. A computer program product comprising a non-transitory computer readable storage medium having instructions encoded thereon that, when executed by a processor, cause the processor to:
receive, at an online system, a plurality of candidate content item components for including in one or more content items to be presented to a plurality of viewing users of the online system;
perform a scoring process for a set of the plurality of candidate content item components, the scoring process comprising:
generate a training content item comprising the set of the plurality of candidate content item components;
present the training content item to one or more viewing users of the online system, the training content item included in a feed of content items presented to each viewing user via a user interface of the online system;

receive information describing a performance metric associated with each impression of the content item, the information comprising one or more attributes associated with each of the one or more viewing users to whom the training content item was presented; and compute an affinity score of each of the one or more viewing users for each of the set of the plurality of candidate content item components based at least in part on the information describing the performance metric associated with each impression of the content item, the affinity score associated with the one or more attributes associated with each of the one or more viewing users to whom the training content item was presented;

for each of a plurality of sets of candidate content item components, each set different from one another, repeat the scoring process until a distribution of affinity scores computed for each of the plurality of candidate content item components is less than a threshold distribution, wherein the different set of the plurality of candidate content items is selected using a heuristic;

identify an opportunity to present content to a subject user of the online system, the subject user associated with one or more additional attributes;

identify one or more of the plurality of candidate content item components eligible to be included in an optimal content item for presentation to the subject user, eligibility based on targeting criteria associated with the optimal content item;

predict, using a machine-learned model, an affinity score of the subject user for each of the one or more candidate content item components based at least in part on the affinity scores for the set of the plurality of candidate content item components, the one or more attributes associated with the viewing users, and the one or more additional attributes associated with the subject user;

assemble the optimal content item to present to the subject user, the assembly based on the affinity score of the subject user for each of the one or more candidate content item components and the optimal content item comprising the one or more candidate content item components; and present the assembled optimal content item to the subject user on a side of the user interface of the online system.

13. The computer program product of claim 12, wherein the heuristic comprises Thompson Sampling on a function, the function based at least in part on a number of impressions achieved by one or more training content items comprising each of the plurality of candidate content item components.

14. The computer program product of claim 12, wherein the heuristic comprises Thompson Sampling on a function, the function based at least in part on an assumption about a number of impressions achieved by one or more training content items comprising each of the plurality of candidate content item components.

15. The computer program product of claim 12, wherein the distribution of the set of affinity scores computed for each of the plurality of sets candidate content item components is inversely proportional to a number of impressions achieved by one or more training content items comprising each of the plurality of candidate content item components.

16. The computer program product of claim 12, wherein a subset of the set of the plurality of candidate content item components are randomly selected from the plurality of candidate content item components.

17. The computer program product of claim 12, wherein repeat the scoring process for the different set of the plurality of candidate content item components is further based at least in part on achieving at least a threshold number of impressions of one or more training content items comprising one or more of the plurality of candidate content item components.

18. The computer program product of claim 12, wherein the plurality of candidate content item components comprises one or more types of candidate content item components.

19. The computer program product of claim 18, wherein the one or more types of candidate content item components are selected from a group consisting of: an image component, a call to action component, a video component, an audio component, a title component, a body component, and any combination thereof.

20. The computer program product of claim 12, wherein the one or more attributes associated with the viewing users, and the one or more additional attributes associated with the subject user have at least a threshold measure of similarity to each other.

21. The computer program product of claim 12, wherein the training content item is generated subject to one or more rules received from a content-providing user of the online system from which the plurality of candidate content item components was received.

22. The computer program product of claim 12, wherein the non-transitory computer readable storage medium further has instructions encoded thereon that, when executed by the processor, cause the processor to:

store the affinity score of each of the one or more viewing users for each of the sets of the plurality of candidate content item components.

23. A method comprising:

for each of a plurality of candidate content item components eligible to be included in one or more content items to be presented to a plurality of viewing users of an online system, performing a scoring process, the scoring process comprising:

generating a training content item comprising a candidate content item component of the plurality of candidate content item components;

presenting the training content item to one or more viewing users of the online system, wherein the training content item is included in a feed of content items presented to each viewing user via a user interface of the online system;

receiving information describing a performance metric associated with each impression of the content item, the information comprising one or more attributes associated with each of the one or more viewing users to whom the training content item was presented; and computing an affinity score of each of the one or more viewing users for each of the plurality of candidate content item components based at least in part on the information describing the performance metric associated with each impression of the content item, the affinity score associated with the one or more attributes associated with each of the one or more viewing users to whom the training content item was presented;

for each of a plurality of sets of candidate content item components, each set different from one another, repeating the scoring process until a distribution of affinity scores computed for each of the plurality of candidate content item components is less than a threshold distribution;

identifying an opportunity to present content to a subject user of the online system, the subject user associated with one or more additional attributes;

identifying one or more of the plurality of candidate content item components eligible to be included in an optimal content item for presentation to the subject user, eligibility based on targeting criteria associated with the optimal content item;

predicting, using a machine-learned model, an affinity score of the subject user for each of the one or more candidate content item components based at least in part on the affinity scores for the set of the plurality of candidate content item components, the one or more attributes associated with the viewing users, and the one or more additional attributes associated with the subject user;

assembling the optimal content item to present to the subject user, the assembling based on the affinity score of the subject user for each of the one or more candidate content item components and the optimal content item comprising the one or more candidate content item components; and presenting the assembled optimal content item to the subject user on a side of the user interface of the online system.

* * * * *